United States Patent [19]
Ganz

[11] 3,883,899
[45] May 20, 1975

[54] GLOVE

[75] Inventor: Rudolph V. Ganz, Canton, Ohio

[73] Assignee: Affiliated Hospital Products, Inc., St. Louis, Mo.

[22] Filed: June 26, 1974

[21] Appl. No.: 483,160

Related U.S. Application Data

[60] Continuation of Ser. No. 288,381, Sept. 12, 1972, abandoned, which is a continuation of Ser. No. 159,263, July 2, 1971, abandoned, which is a division of Ser. No. 876,812, Nov. 14, 1969, abandoned.

[52] U.S. Cl. .................................................. 2/168
[51] Int. Cl. ............................................ A41d 19/00
[58] Field of Search ............... 2/167, 168, 159, 158

[56] References Cited
UNITED STATES PATENTS

| | | | |
|---|---|---|---|
| 919,406 | 4/1909 | Warren | 2/168 |
| 2,120,406 | 6/1938 | Hansen | 2/168 |
| 2,173,734 | 9/1939 | Sidnell | 2/168 |
| 2,393,298 | 1/1946 | DeLaney et al. | 2/168 |

*Primary Examiner*—Geo. V. Larkin
*Attorney, Agent, or Firm*—Reginald F. Pippin, Jr.

[57] ABSTRACT

A rubber latex glove having a textured interior surface and a textured exterior surface, one of the textured surfaces being transfer textured and the other textured surface being formed by impact spray on a molded rubber latex film with liquid rubber latex droplets while the film is in uncured condition.

11 Claims, 5 Drawing Figures

GLOVE

This is a continuation of my co-pending application Ser. No. 288,381, filed September 12, 1972 (now abandoned), which in turn is a continuation of my co-pending application Ser. No. 159,263, filed July 2, 1971 (now abandoned), which in turn is a divisional application of my co-pending application Ser. No. 876,812, filed Nov. 14, 1969 now abandoned. This invention relates to a rubber latex glove having inner and outer textured surfaces.

It is desirable in surgical gloves to provide roughened or textured inner and outer surfaces. However, although various attempts have been made to provide double roughened or textured surfaced gloves, none have to my knowledge been fully satisfactory, due to various factors. It is accordingly a feature of this invention to provide an improved rubber latex glove having a textured exterior palm, fingers and thumb gripping surface and a textured interior surface of overall unique construction, and of particularly unique construction in the exterior textured surface thereof.

Briefly, according to the present invention, a seamless integral rubber latex glove is formed by dipping a textured surfaced form sequentially into coagulant and rubber latex baths and impacting the uncured resultant film on the form with fine droplets of uncured liquid rubber latex in the form of a spray to thereby form impact craters and a build-up of walled craters and random plateau accumulations on the film surface. The spray is directed at the palm side of the film on the glove form, and is formed by multiple spray nozzles whose spray paths intersect in order to provide desired gripping surface coverage by the spray droplets. The resulting glove has the following features:

1. The improved textured exterior gripping surface provides quite adequate grip on surgical instruments and body tissues that tend to become slippery in the normal body fluids.
2. The inside textured surface reduces likelihood of slippage of the surgeon's hand inside the glove during a surgical procedure, normally caused by perspiration, as the textured inner surface apparently enables the perspiration to flow away from any pressured surface without "skating" of the glove over the hand surface.
3. The textured inner surface provides a stippled effect which appears to reduce the skin-to-glove coefficient of friction, as the gloves require less pull and effort to don.
4. The stipple textured inner surface reduces skin contact area and thereby reduces the likelihood of dermatitis.
5. Reduction in exterior gripping surface tackiness, normally associated with introduction of ordinary rubber latex film into body fluids, such as blood, mucous, etc.
6. The inner and outer finely textured homogenous integral film rubber latex construction of the glove provides a highly pliable, soft and touch-sensitive glove, whereby body tissue can be contacted and examined and instruments can be handled with a high degree of sensitivity while wearing the glove.

Still other objects, features and attendant advantages will become apparent to one skilled in the art from a reading of the following detailed description of a preferred physical embodiment constructed in accordance with the invention, taken in conjunction with the accompanying drawings, wherein.

Figure 1:
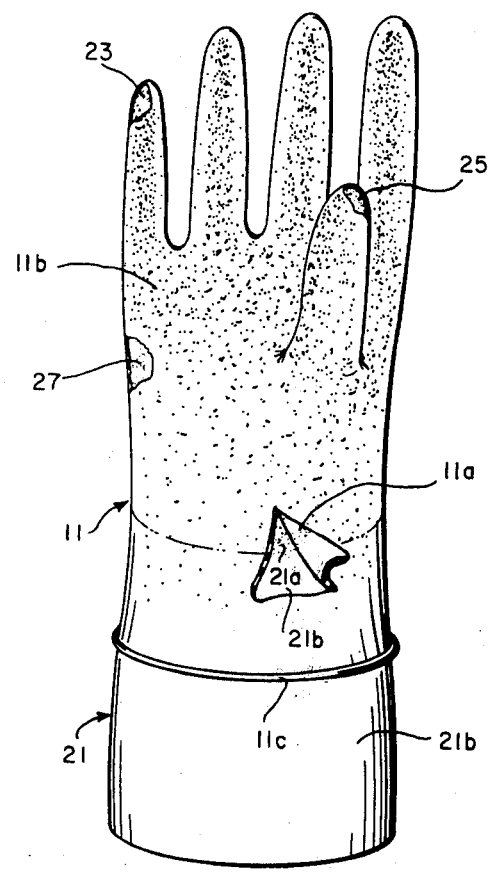
FIG. 1 is a schematic view of a glove according to the invention, disposed on a glove form on which it is made.

Referring now in detail to the Figures of the drawings, a seamless homogeneous integral film glove 11 is formed on a glove form 21 which may be of standard configuration with fingers 23 and a frontal thumb 25 connecting with a palm zone 27. The form 21 may be of conventional material such as porcelain, and is provided with a textured surface 21a about its major hand engaging area, including the entire area over the fingers, thumb and hand body. If desired, the wrist zone 21b may be glazed to provide a smooth surfaced cuff surface which is generally considered to aid in rolled bead 11c formation.

The textured inner hand-engaging surface 11a of the glove 11 is transfer textured as a direct transfer function of the texture of the mold form in this zone. While any desired pattern or degree of texture roughness may be employed as desired for a given application, a preferred textured form surface 21a for surgical and medical examination gloves has been found to be provided by a sandblasted procelain ceramic form 21 which has a surface finish 21a about the same as fine sandpaper. Transfer texturing or roughening from such a sandblasted surface 21a provides a highly desirable interior stippled hand-engaging surface.

The exterior textured surface 11b of the glove 11 is formed by impacting the gripping surfaces with fine droplets of an aqueous rubber latex solution, as more fully described hereinafter.

Figure 2:
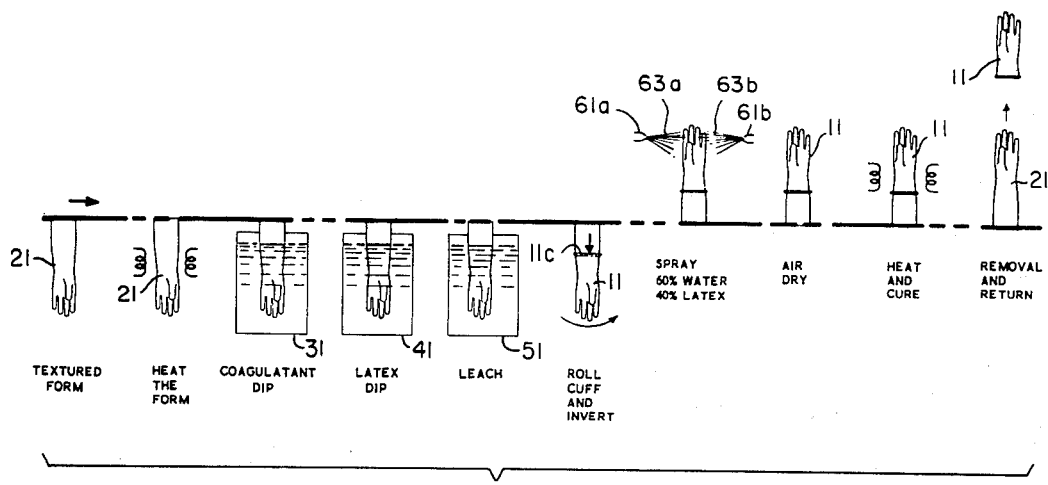
FIG. 2 illustrates schematically a flow sequence for manufacture of a glove according to the invention.

In the formation of a dual surface textured glove according to the method of my invention, each form or forms 21, which may be suitably mounted on a desired carrier, such as a movable board 29 or a conveyor chain, is carried sequentially through a series of steps as illustrated schematically in FIG. 2. Form 21 is dipped into a slip dip bath of conventional natural rubber latex in the normal manner to form a film on the form, as shown in the fourth segment of FIG. 2. In forming this film it is preferable to precede the rubber latex dip step by dipping the form 21 in a bath of suitable coagulant material, which may be of conventional composition, in order to increase the rate of latex film formation and decrease the time for such formation. As an aid to fast coagulant liquid evaporation, the form 21 may be preheated before dipping into the coagulant, thereby quickly providing a desired positively charged form coagulant coating for coagulation of the negatively charged rubber latex onto the form during the latex dip operation. For surgical gloves, the basic dried and cured film thickness may suitably be of the order of approximately 0.004–0.006 inch, with an impact crater build-up palm and finger gripping zone thickness (as later described) of approximately 0.005–0.008 inch, although increases or decreases in these dimensions may of course be made as may be desired for a particular use.

The latex dip may be of any desired rubber content, a conventional mix being approximately 40 per cent solids and 60 per cent water, with such heat curing and other agents therein as may be desired. Between each of the dip steps a short drying interval takes place, and if desired, the forms may be angularly moved and/or rotated or otherwise moved to aid in evening the film formation on the forms 21.

After the aqueous rubber latex dip, the glove film on the form 21 is subjected to a conventional leaching, as with water, to remove the coagulant, after which the cuff is conventionally rolled to form a bead 11c and is inverted for the next operation.

The glove film on the now inverted form is thereupon sprayed with an aqueous mix of uncured rubber latex, which is preferably of the same composition as the latex slip dip, and which may be adjusted to a desired viscosity, as by using more or less percentage of water, for spraying, to form a fine droplet spray. The spray droplets are impacted onto and form a homogeneous integral part of the uncured partially dried slip dip glove film. It is an important feature that the latex droplets are impacted onto the surface from two sources, angularly differently directed, and preferably intersecting spray relation, to afford effective coverage of the glove gripping surfaces including the palm, fingers, and thumb.

Figure 3:
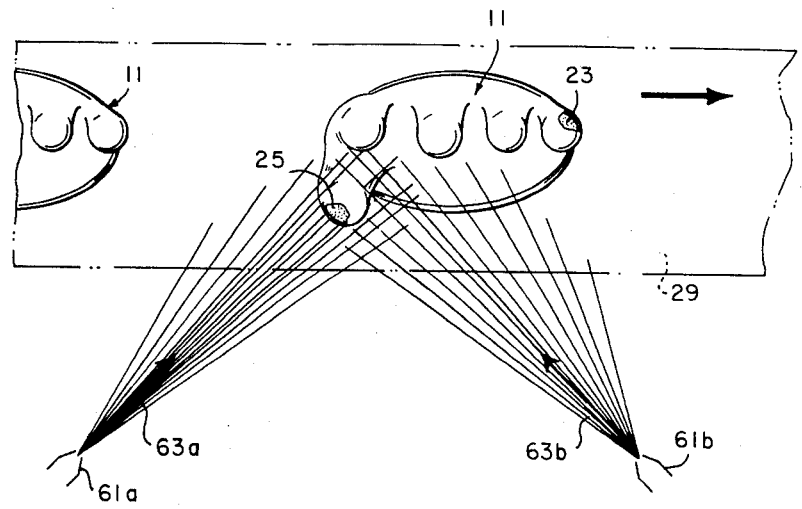
FIG. 3 is a plan view illustrating schematically the impact spraying of the dipped glove film.
Figure 4:
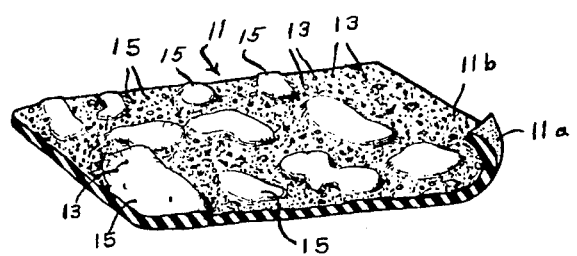
FIG. 4 is an enlarged (e.g., of the order of 10–20X) fragmentary schematic view of a typical section of the glove film in the double textured palm and finger gripping zones.

The presently preferred arrangement incorporates two conventional spray nozzles 61a, 61b, of the type employed to spray conventional paint mixes, the nozzles 61a, 61b being substantially horizontal and directed at approximately 45° to the palm face of the glove form 21 and to the longitudinal path of motion of the forms 21 past the nozzles. The center lines of the nozzle sprays (as indicated by the arrows in FIG. 3) are thus approximately normal to one another in this preferred arrangement and method, and the spray from the nozzles not only impacts from the two basic angularly opposed nozzle directions onto the glove film, but also impacts at different angles through the fanning out action of the individual sprays, and as the glove form passes longitudinally in front of the nozzles thereby aiding in affording wide impact droplet coverage of the various gripping surfaces of the glove. In addition, the spatial intersection of the paths of the droplets from the two spray sources in front of the glove form aids in providing coverage on the inner or crotch-facing surface of the thumb film which faces toward the palm of the form 21. This latter action will be appreciated as being generally enhanced by the intersection of the differently directed spray droplets in the zone between the thumb 25 and the palm 27 of the form 21 as the form passes the nozzles, which intersection of particles causes random vector scattering motion of the droplets, including collision-rebound droplet motion onto the thumb inner surface, in addition to such angular coverage of this and the other gripping surfaces as is afforded by the basic angular directions of the nozzles 61a, 61b toward the glove form. The glove forms 21 may be traversed past the nozzles in either lateral direction, rectilinearly or thru an arc if so desired.

The center lines of the nozzles are preferably directed along lines intersecting the central sections of the fingers 23 and thumb 25, thereby affording good coverage of the palm, finger and thumb gripping areas. Droplet coverage of the wrist or cuff zone is of no functional value, and is optional. Thus, the spray nozzles may have their spray patterns relatively tight as may be desired, and the nozzles may be spaced relatively close, e.g., approximately a foot or less, to the glove film surface so as to conserve materials, if desired.

Figure 5:
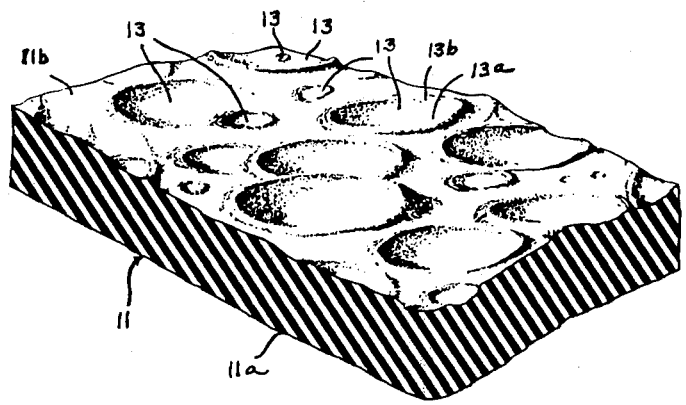
FIG. 5 is a further enlarged (e.g., of the order of 100–200X) fragmentary schematic view of a section of the double textured glove film schematically illustrating an impact crater zone.

The fine droplets of the latex spray impact onto the uncured latex film surface and form tiny craters, which appear to be similar to those formed by meteoritic impact with the earth or moon, the craters generally having a central dish-shaped central zone surrounded by a raised rim zone which protrudes above the surrounding impacted area. The droplets thus serve to build up the film surface and to form dish-shaped depressions and protruding cup shaped rims. These droplet impact craters are highly multiplied in nature and, as with other randomly impacted surfaces, the craters will overlap, as shown schematically in the enlarged schematic Figures of the drawing (see particularly FIG. 5). As will be appreciated, the size, quantity, and density of the impact craters will vary widely, and the drawings are schematic and illustrative only, not necessarily being to scale or illustrating any specific actual impact build-up zone.

The particular extent of build-up of impacted spray droplet craters on the glove film may be adjusted as desired by varying the spray pressure and viscosity and the rate of feed of the glove forms 11 past the nozzles 61a, 61b. A preferred degree of build-up of the droplet impact cratered surface has been found to exist when the droplets begin to accumulate in random areas to form fluid plateau-like mesa areas 15, thereby providing a composite surface of impact droplet craters 13 and free-form plateau-like raised mesa areas 15 randomly interspersed on the film surface 11b. The mesa areas in various instances also appear to have some small randomly spaced impact craters, depressions or ridges formed on their surface, although such are not as prominent as in the interspace zones between mesas and the mesa surfaces appear to be generally more flat than the zones therebetween and which may be effectively substantially covered with spaced and overlapping impact craters.

The precise nature of the formation of this desirable impact crater textured surface is not fully understood; however, as the tiny droplets have a high content of water, it is speculated that the crater central zone dish depressions tend to become more exaggerated upon drying of the water from the craters, and the mesa zones appear to be an accumulation of impact droplets which form small raised liquid "lakes" held in place by their own liquid surface tension and which dry generally smoother than the lesser accumulative or non-accumulative impact droplet crater areas therebetween.

As stated above, this is the preferred impact latex droplet textured surface, although more or less extent of impacting, and consequent increase or decrease in impact overlap and accumulation, may be employed if desired.

After latex spraying, the glove film 11 is air dried and then cured as by heating in a conventional manner, and may then be removed from the form 21, after which the form may be recycled.

The net result is a seamless homogeneous rubber latex glove which is soft, and pliable, affords excellent sensitivity for surgical and medical purposes, and has highly desirable textured surfaces on both its inner and outer surfaces, thereby providing for ease of donning, minimizing causation of dermatitis, anti-skid action on a perspiring hand during surgery, and enhanced friction gripping particularly by the multiple suction cup-like impact craters and ridged surfaces of the exterior surface.

While the invention has been shown and described with respect to a particular illustrative embodiment, it will be apparent to those skilled in the art that various modifications and improvements may be made without departing from the scope and spirit of the invention. Accordingly, the invention is not to be restricted by the particular illustrative embodiment, but only by the scope of the appended claims.

That which is claimed is:

1. An elastic latex rubber glove formed of a film of rubber latex and having palm and finger gripping exterior surfaces,
the major hand-engaging interior surface of said glove having a molded rough finish,
said exterior palm and finger gripping surfaces of said glove being rough in finish,
the entire said glove, being an integral homogeneous film of cured rubber latex,
said exterior palm and finger gripping surfaces having tiny annular craters formed thereon,
said craters being formed of depression-forming droplets of rubber latex in integral cured state relation with and forming an integral part of the base film forming said glove,
said exterior palm and finger gripping rough surface including multiple raised mesa areas of larger area than individual ones of said craters and with a plurality of said craters disposed in zones therebetween.

2. An elastic rubber glove according to claim 1, said craters on said exterior palm and finger gripping rough surfaces including raised side wall craters having raised peripheral side walls surrounding a generally dish-shaped central zone, and said side walls of said raised side wall craters protruding beyond the immediately adjoining surrounding surface of said glove.

3. An elastic rubber glove according to claim 1, said raised mesa areas including droplet accumulations of lateral free-form configuration and having a generally plateau-like upper surface.

4. An elastic rubber glove according to claim 3, said raised mesa areas being generally randomly interspersed and having randomly sized and spaced said craters thereon,
with said craters disposed randomly in spacing and size between said raised mesa areas.

5. An elastic rubber glove according to claim 3, said craters having raised rims and dish-shaped central zones.

6. An elastic rubber glove according to claim 3, said raised mesa areas being generally randomly interspersed and randomly intersecting and separated,
and having randomly sized and spaced said craters thereon,
and having said craters disposed randomly in spacing and size between said raised mesa areas,
said craters having raised rims and dish-shaped central zones.

7. An elastic rubber glove according to claim 6, said raised mesa areas being random zones with smaller said craters disposed in random quantity size and spacing on various ones thereof.

8. An elastic latex rubber glove formed of a film of rubber latex and having palm and finger gripping surfaces,
the exterior palm and finger gripping surfaces of said glove being rough in finish,
the entire said glove being an integral homogeneous film of cured rubber latex,
said exterior palm and finger gripping surfaces having tiny craters formed thereon,
said craters being formed of depression-forming additive droplets of rubber latex in integral cured state relation with and forming an integral part of the base film forming said glove,
said exterior palm and finger gripping rough surface including multiple raised mesa areas of larger area than the area of individual ones of said craters and with a plurality of said craters disposed in zones therebetween.

9. An elastic rubber glove according to claim 8, said raised mesa areas including droplet accumulations of lateral free-form configuration and having a generally plateau-like upper surface.

10. An elastic rubber glove according to claim 9, said mesa areas being generally randomly interspersed and having randomly sized and spaced said craters thereon,
with said craters disposed randomly in spacing and size between said mesa areas.

11. An elastic rubber glove according to claim 10, said mesa areas being random build-up zones with smaller said craters disposed in random quantity size and spacing on various ones thereof.

* * * * *